US012505768B1

(12) United States Patent
Chao et al.

(10) Patent No.: US 12,505,768 B1
(45) Date of Patent: Dec. 23, 2025

(54) METHODS FOR NEURAL NETWORK-BASED COLOR SHIFT CORRECTION IN DISPLAY PANELS

(71) Applicant: NOVATEK Microelectronics Corp., Hsin-Chu (TW)

(72) Inventors: Chang-Po Chao, Taipei (TW); Tzu-Lung Pan, New Taipei (TW); Ling-Yu Chuang, Kaohsiung (TW); Yang-Chen Chang, Taoyuan (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/915,326

(22) Filed: Oct. 14, 2024

(30) Foreign Application Priority Data

Aug. 29, 2024 (TW) ................................ 113132493

(51) Int. Cl.
*G06T 15/00* (2011.01)
*G09G 3/00* (2006.01)
*G09G 3/3208* (2016.01)
*G09G 5/02* (2006.01)

(52) U.S. Cl.
CPC ..... *G09G 3/006* (2013.01); *G09G 2320/0233* (2013.01); *G09G 2320/0242* (2013.01); *G09G 2320/0666* (2013.01); *G09G 2330/12* (2013.01)

(58) Field of Classification Search
CPC .......... G09G 3/006; G09G 2320/0233; G09G 2320/0242; G09G 2320/0666; G09G 2330/12
See application file for complete search history.

(56) References Cited

U.S. PATENT DOCUMENTS

| | | | | |
|---|---|---|---|---|
| 5,375,193 A * | 12/1994 | Adams, Jr. | G01J 3/46 345/603 |
| 8,847,972 B2 * | 9/2014 | Kane | H04N 21/4318 345/589 |
| 2010/0007599 A1 | 1/2010 | Kerofsky | |
| 2010/0054589 A1 * | 3/2010 | Ishii | H04N 1/40 382/167 |
| 2013/0188229 A1 * | 7/2013 | Paul | B41F 7/02 358/475 |
| 2021/0142721 A1 * | 5/2021 | Kim | G09G 3/3225 |

FOREIGN PATENT DOCUMENTS

| | | |
|---|---|---|
| CN | 117690393 | 3/2024 |
| CN | 118446927 | 8/2024 |

* cited by examiner

*Primary Examiner* — Kwang-Su Yang
(74) *Attorney, Agent, or Firm* — Winston Hsu

(57) ABSTRACT

A method of correcting color shifts in display panels includes converting target RGB values to XYZ values, converting the XYZ values to RGB values using an inverse model, and a panel under test displaying a pixel according to the RGB values. The inverse model is trained based on a neural network model.

33 Claims, 6 Drawing Sheets

METHODS FOR NEURAL NETWORK-BASED COLOR SHIFT CORRECTION IN DISPLAY PANELS

BACKGROUND OF THE INVENTION

1. Field of the Invention

The present invention relates to a correction method for color shifts in a display panel, in particular to a correction method for color shifts in an organic light-emitting diode (OLED) display panel.

2. Description of the Prior Art

Display panels are essential components of modern electronic devices, including liquid crystal display (LCD) panels, organic light-emitting diode (OLED) panels, and quantum dot panels. LCD panels are known for their thinness, light weight, and energy efficiency. OLED panels offer high contrast and a wide color gamut, while quantum dot panels provide high saturation and a wide color gamut. These display panels are widely used in televisions, computer monitors, mobile phones, tablets, vehicle display systems, digital signage, industrial control monitors, and more, delivering high-quality visual experiences in modern life.

However, due to varying display characteristics and user expectations, the colors displayed on these panels often deviate from the intended colors. To achieve the desired visual effect, display panels require color correction to eliminate color shifts caused by their inherent characteristics and ensure that the displayed colors match the real colors. Besides the initial factory calibration, the color accuracy of display panels can drift over time, necessitating regular color calibration.

During color shift correction, the RGB values of the input panel are measured and calibrated against the XYZ and Lab values output by the panel. Traditional methods often use polynomial functions to calculate a transformation matrix and perform color calibration through iterative calculations. Another approach involves building a look-up table (LUT) and using linear interpolation to achieve color calibration. While these existing methods are widely used in color calibration, they have limitations, such as requiring significant time and computational resources to achieve accurate correction results.

SUMMARY OF THE INVENTION

A method of correcting color shifts in display panels includes converting a set of target RGB values to a set of XYZ values, converting the set of XYZ values to a set of RGB values using an inverse model, and a panel under test displaying a pixel according to the set of RGB values. The inverse model is trained based on a neural network model.

A correction method for color shifts in display panels includes converting a set of XYZ values to a set of target Lab values according to a real white point of a panel under test, converting the set of XYZ values to a set of RGB values according to an inverse model, converting the set of RGB values to a set of predicted Lab values according to the real white point and a forward model, adjusting the set of RGB values according to the set of predicted Lab values and the set of target Lab values to generate a set of adjusted RGB values, and displaying a pixel on a panel under test according to the set of adjusted RGB values. The inverse model and the forward model are generated based on different neural network model trainings.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
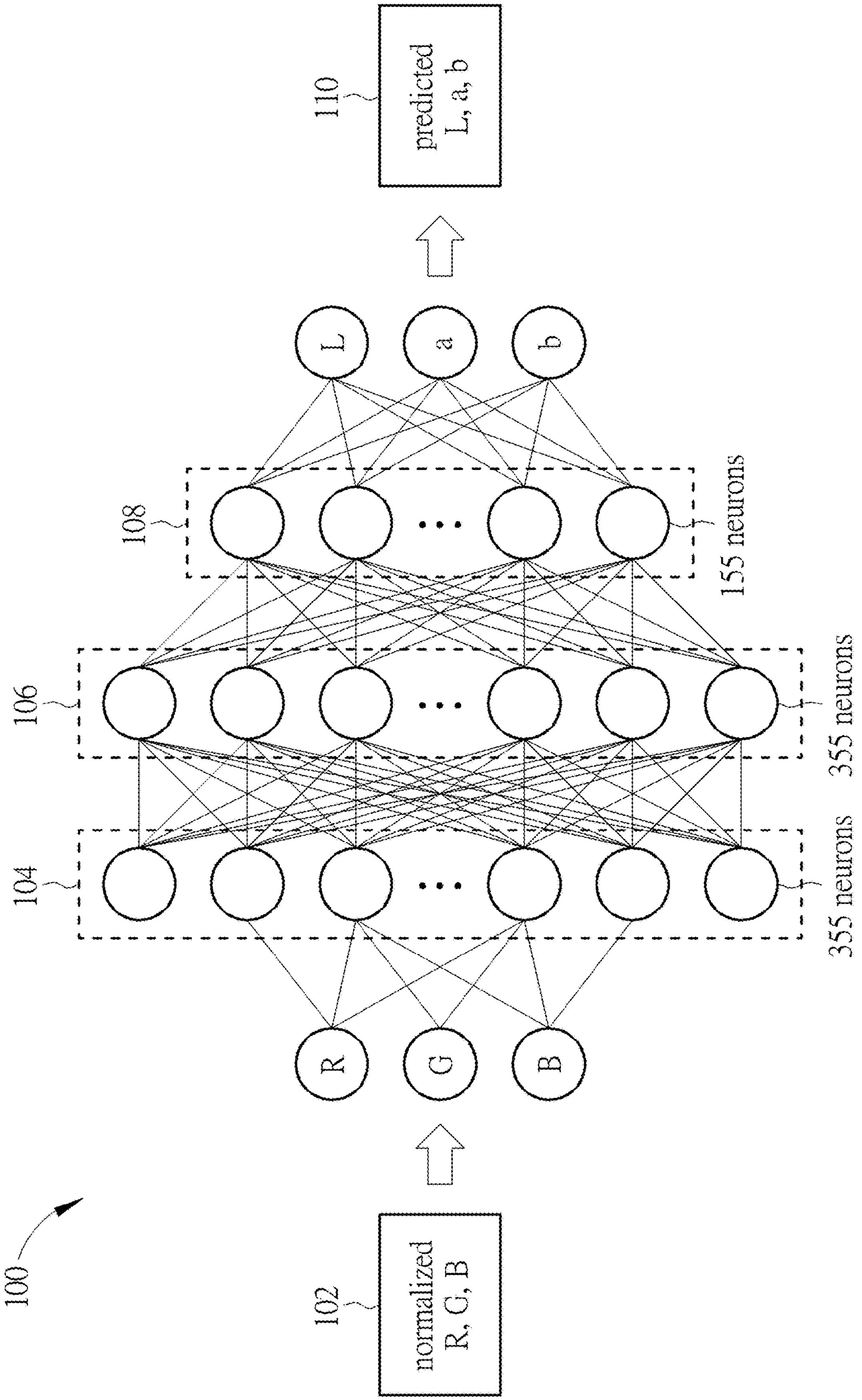
FIG. 1 is a neural network architecture diagram of a forward model according to an embodiment of the present invention.

The RGB color space, XYZ color space and Lab color space used in the embodiment of the present invention are defined as follows. The RGB color space uses a combination of three basic colors: red (R), green (G), and blue (B) to produce various colors. The R, G, and B values represent the grayscale values of red, green, and blue light respectively. The grayscale values can range from 0 to 255. When the R, G, and B values are all 0, the color produced can be close to black; when the R, G, and B values are all 255, the color produced can be close to white. R, G, and B values are collectively referred to as RGB values and can be provided to televisions, computer monitors, and electronic display devices to produce images. For example, the color of each pixel in a color picture on a computer is generated by a specific RGB value.

The XYZ color space was developed by the international commission on illumination (CIE) to describe the human eye's perception of light. The Y value represents luminance, the Z value is approximately equal to blue in the RGB model, and the X value is the mixed color of the red, green, and blue curves. X, Y and Z values are collectively referred to as XYZ values, which represent virtual reference stimulus values. XYZ values are mathematical expressions of color and independent from human subjective visual experience. XYZ values can be measured by a colorimeter or spectrophotometer and are used for color conversion and mapping between devices.

The Lab color space was also developed by CIE to mathematically simulate human visual perception. The L value represents the perceived lightness component, the a value represents the chromaticity component from green to red, and the b value represents the chromaticity component from blue to yellow. The L, a, and b values are collectively called Lab values, which are used to describe the color performance of a specific display panel. Roughly speaking, RGB can be used for electronic display, XYZ can be used for color calculation and device mapping, and Lab can be used to simulate the human eye's perception of a specific display panel.

The unique innovative features of the present invention include transfer learning, white point correction, forward model and inverse model, which jointly construct a set of neural network model color correction algorithms. For unknown panels (panels under test), a small number of color combinations can be selected to capture experimental color data. Based on the baseline model established with a large amount of data in advance, transfer learning can be implemented to establish the forward model and inverse model of the unknown panel in a short time. Luminance accuracy is ensured when using a forward model to achieve color compensation before color correction. White point correction ensures brightness accuracy through a forward model and also verifies and ensures the accuracy of color correction. The inverse model provides effective initial color compensation guesses, making the correction process fast and accurate.

Embodiments of the present invention primarily utilize artificial intelligence (AI) technology to establish a neural network (NN) model, replacing the traditional use of 3D lookup tables and 3D linear interpolation for color correction. This approach achieves more accurate results by handling complex and high-dimensional nonlinear equations, allowing the model to learn diverse and intricate panel information. When the model closely aligns with the panel's grayscale value information, the accuracy of panel correction is significantly enhanced, and the compensation time is reduced.

To avoid disrupting the panel production line, the invention employs known panels to create a pre-trained forward model. For an unknown panel, N groups (where N is a positive integer) of the most representative RGB values are selected from the 19,683 possible RGB combinations on the panel. The data corresponding to these N groups of RGB values is then measured. Using the baseline model combined with transfer learning technology, a neural network model that closely approximates the unknown panel data is constructed in a short time. This method requires only N sets of RGB values, greatly reducing the time needed for measuring panel data on the production line. The 19,683 RGB groups mentioned are merely an example and do not limit the scope of the invention.

FIG. 1 is a neural network architecture diagram of a forward model 100 according to an embodiment of the present invention. The input values of the forward model 100 are the normalized RGB values 102, and the output values are the predicted Lab values 110, passing through a hidden layer 104 containing 355 neurons, a hidden layer 106 containing 355 neurons, and a hidden layer 108 containing 155 neurons. The number of hidden layers and the number of neurons in each hidden layer of the forward model 100 are only examples, and the present invention is not limited thereto. During the training process, the mean square error (MSE) is used as the loss function and Adam (Adaptive momentum) is used as the optimizer. The initial learning rate (LR) is set to 0.01, and the decay rate of the learning rate is set to 0.7. The training process uses cross validation, trains for 150 epochs, and sets the batch size to 256. Using Lab values as output values of the forward model 100 may provide better color accuracy. In some embodiments, the output values of the forward model 100 may also be predicted XYZ values.

The input values of an inverse model are normalized XYZ values, and output values of the inverse model are predicted RGB values, passing through a hidden layer 1 containing 155 neurons, a hidden layer 2 containing 155 neurons, and a hidden layer 3 containing 155 neurons. The number of hidden layers of the inverse model and the number of neurons in each hidden layer are only examples, and the invention is not limited thereto. During the training process, MSE is used as the loss function and Adam is used as the optimizer. The initial learning rate is set to 0.001, the decay rate of the learning rate is set to 0.9. The training process uses cross validation, and the training period is 150 epochs. The batch size is set to 128.

When faced with unknown panels on the production line, transfer learning can be used to further fine-tune the neural network model. First, the respective 273 RGB values and corresponding XYZ values of each of the 15 known panels are used to establish their respective baseline models in advance, thereby establishing 15 baseline models of the 15 known panels. Next, in one embodiment, the uniformly distributed R values are selected to be [10, 70, 130, 180, 250], the uniformly distributed G values are selected to be [10, 70, 130, 180, 250], the uniformly distributed B values are selected to be [10, 70, 130, 180, 250], thus different permutations and combinations are performed to obtain a total of 125 (=$5^3$) different RGB combinations. The combination is the most representative grayscale RGB combination. In an embodiment, the present invention can select other R values, G values, and B values to achieve the same effect. On the production line, the XYZ values corresponding to each RGB value combination in the unknown panel are measured and used for comparison. Next, the normalized XYZ values $\text{value}_{exact,i}$ corresponding to each RGB combination in the unknown panel is compared with the corresponding normalized XYZ value $\text{value}_{approx,i}$ in the known panel. In one embodiment, the mean absolute error (MAE) is used as an error indicator to measure the difference between two sets of normalized XYZ values, as follows:

$$\text{MAE} = 1/125 \sum_{i=1}^{125} |\text{value}_{approx,i} - \text{value}_{exact,i}| = 1/125 \sum_{i=1}^{125} (|X_{approx,i} - X_{exact,i}| + |Y_{approx,i} + Y_{exact,i}| + |Z_{approx,i} - Z_{exact,i}|)$$

where $X_{approx,i}$, $Y_{approx,i}$, and $Z_{approx,i}$ are the normalized XYZ values in the known panel respectively, and $X_{exact,i}$, $Y_{exact,i}$, and $Z_{exact,i}$ are the normalized XYZ values in the unknown panel respectively.

In another embodiment, the Mean Square Error (MSE) can also be used as an error indicator to measure the difference between two sets of normalized XYZ values, as follows:

$$\text{MAE} = 1/125 \sum_{i=1}^{125} (\text{value}_{approx,i} - \text{value}_{exact,i})^2 = 1/125 \sum_{i=1}^{125} ((X_{approx,i} - X_{exact,i})^2 + (Y_{approx,i} + Y_{exact,i})^2 + (Z_{approx,i} - Z_{exact,i})^2)$$

In another embodiment, the root mean square error (RMSE) can also be used as an error indicator to measure the difference between the two sets of normalized XYZ values, as follows:

$$\text{RMSE} = \sqrt{1/125 \sum_{i=1}^{125} (\text{value}_{approx,i} - \text{value}_{exact,i})^2} = \sqrt{1/125 \sum_{i=1}^{125} ((X_{\text{approx},i} - X_{\text{exact},i})^2 + (Y_{\text{approx},i} + Y_{exact,i})^2 + (Z_{\text{approx},i} - Z_{\text{exact},i})^2)}$$

Based on the comparison of MAE, the baseline model with the smallest difference from the normalized XYZ values of the known panel is selected as the selected baseline model. Then, transfer learning can be performed on the selected baseline model. When facing an unknown panel, the 125 most representative grayscale values can be selected from the $27^3$ grayscale values of the known panel. The 125 most representative grayscale values are formed by an R value from the set [10, 70, 130, 180, 250], a G value from the set [10, 70, 130, 180, 250], and a B value from the set [10, 70, 130, 180, 250]. Then, using the previously established selected baseline model combined with transfer learning technology, a forward model that is very close to the grayscale value information of the unknown panel and an inverse model that can provide guessed RGB values are established in a short time. The forward model and the inverse model will retain the learning results of the neural network model on the known panel and be applied to the data of the unknown panel, thus saving time and cost while maintaining high-precision color correction effects.

Figure 2:
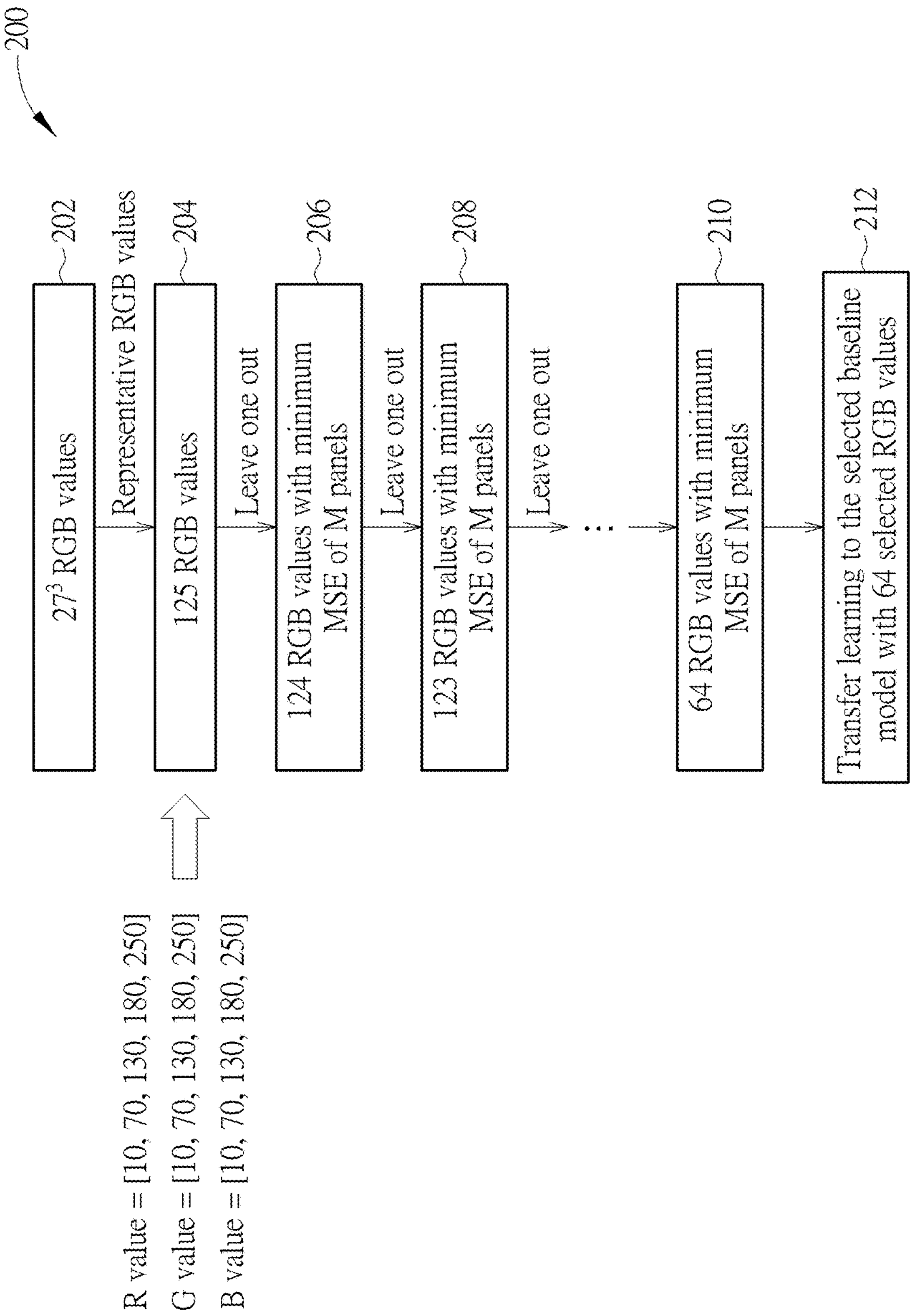
FIG. 2 is a flow chart of a method for selecting 64 sets of RGB values in an embodiment of the present invention.

In another embodiment, sets of RGB values can be selected from 125 sets of representative RGB values to perform transfer learning of the selected baseline model. FIG. 2 is a flow chart of a method 200 for selecting 64 sets of RGB values in an embodiment of the present invention. The method 200 first selects 125 representative RGB values 204 from the $27^3$ training data 202, which are permutations and combinations of an R value from the set [10, 70, 130, 180, 250], a G value from the set [10, 70, 130, 180, 250], and a B value from the set [10, 70, 130, 180, 250]. Then, M baseline models of M known panels trained with $27^3$ data 202 are used to calculate the mean squared error (MSE) of 125 representative RGB values 204. The MSE can be replaced by root mean square error (RMSE) or mean absolute error (MAE). Delete the set of RGB values with the largest MSE to get 124 sets of RGB values 206 with the smallest MSE in the M known panels. Then, delete the set of RGB values with the largest MSE to obtain 123 sets of RGB values 208 with the smallest MSE among the M known panels. Continue this step until the remaining 64 sets of RGB values 210 with the smallest MSE among the M known panels are left. These selected 64 sets of RGB values 212 will be used to perform transfer learning on the selected baseline model of the unknown panel. 64 sets of RGB values are just an example, and the present invention is not limited thereto. Instead, 64 sets of RGB values can be replaced with N sets of RGB values where N is a positive integer.

On the production line, 64 sets of XYZ values corresponding to the 64 sets of RGB values in the unknown panel are measured and used for comparison. Next, a set of normalized XYZ values $\text{value}_{exact,i}$ corresponding to each set of RGB values in the unknown panel is compared with a corresponding set of normalized XYZ values $\text{value}_{approx,i}$ in the known panel. In one embodiment, the mean absolute error (MAE) is used as an error indicator to measure the difference between the two sets of normalized XYZ values, as follows:

$$\text{MAE}=\tfrac{1}{64}\Sigma_{i=1}^{64}|\text{value}_{approx,i}-\text{value}_{exact,i}|$$

In another embodiment, the Mean Square Error (MSE) can also be used as an error indicator to measure the difference between the two sets of normalized XYZ values, as follows:

$$\text{MAE}=\tfrac{1}{64}\Sigma_{i=1}^{64}(\text{value}_{approx,i}-\text{value}_{exact,i})^2$$

In another embodiment, the root mean square error (RMSE) can also be used as an error indicator to measure the difference between the two sets of normalized XYZ values, as follows:

$$\text{RMSE}=\sqrt{\tfrac{1}{64}\Sigma_{i=1}^{64}(\text{value}_{approx,i}-\text{value}_{exact,i})^2}$$

The detailed calculations of MAE, MSE, and RMSE have been illustrated, and thus will not be further elaborated.

Figure 3:
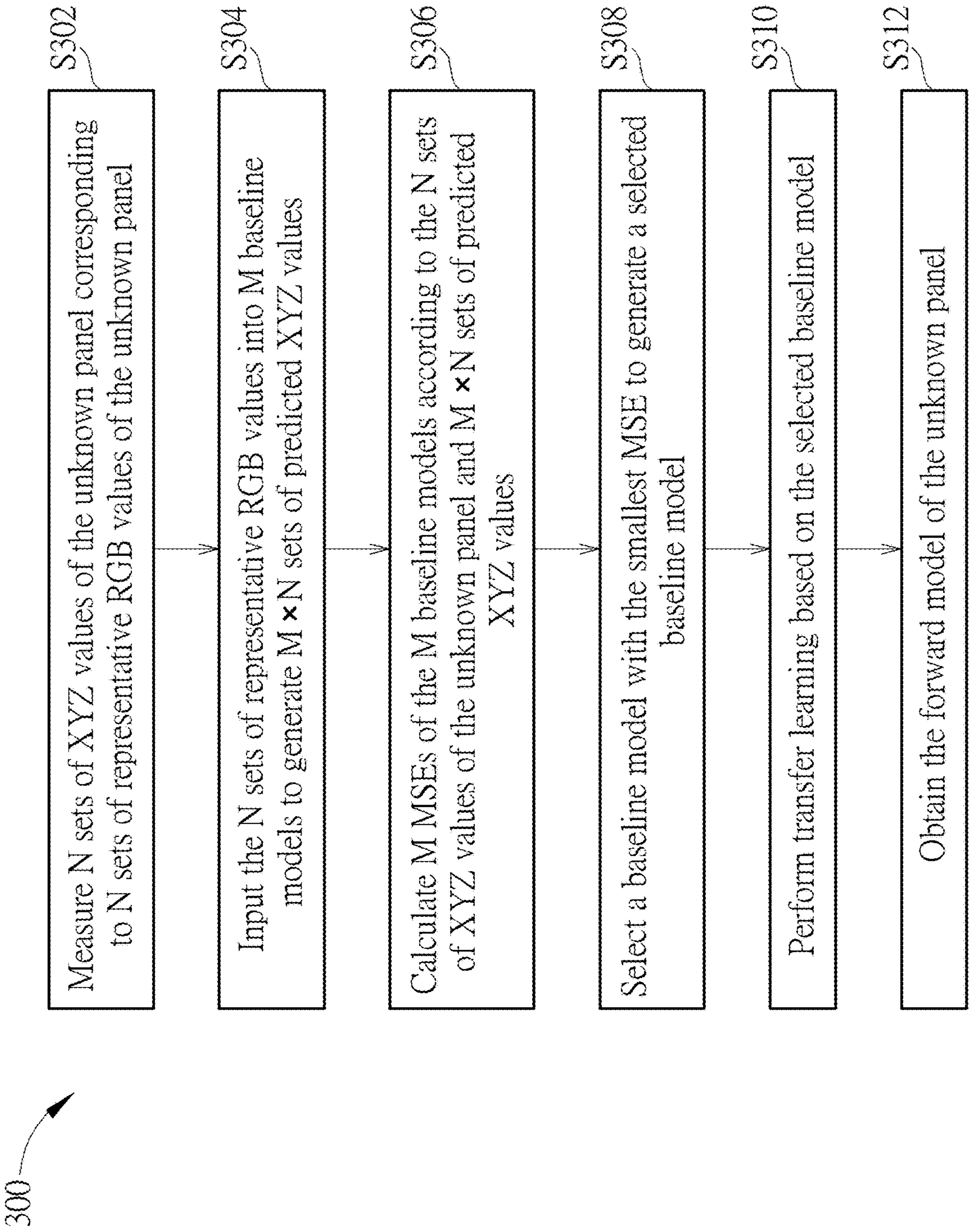
FIG. 3 is a flow chart of a forward model transfer learning method according to an embodiment of the present invention.

FIG. 3 is a flow chart of a forward model transfer learning method 300 according to an embodiment of the present invention. The method 300 includes steps S302 to S312. Any reasonable technical changes or step adjustments fall within the scope disclosed by the present invention. Steps S302 to S312 are explained as follows:

- Step S302: Measure N sets of XYZ values of the unknown panel corresponding to N sets of representative RGB values of the unknown panel;
- Step S304: Input the N sets of representative RGB values into M baseline models to generate MXN sets of predicted XYZ values;
- Step S306: Calculate M MSEs of the M baseline models according to the N sets of XYZ values of the unknown panel and M×N sets of predicted XYZ values;
- Step S308: Select a baseline model with the smallest MSE to generate a selected baseline model;
- Step S310: Perform transfer learning based on the selected baseline model; and
- Step S312: Obtain the forward model of the unknown panel.

In step S302, N sets of XYZ values corresponding to N sets of representative RGB values of the unknown panel are measured. The N sets of representative RGB values are selected from the method 200 in FIG. 2. In one embodiment, N may be 64. In step S304, N sets of representative RGB values are input into M baseline models to generate M×N sets of predicted XYZ values, and each baseline model generates N sets of predicted XYZ values. In one embodiment, M may be 15. In step S306, M MSEs of the M baseline models are calculated according to the N sets of XYZ values of the unknown panel and M×N sets of predicted XYZ values. In one embodiment, MSE can be replaced by root mean square error (RMSE) or mean absolute error (MAE). The detailed calculations of MAE, MSE, and RMSE have been illustrated, and thus will not be further elaborated. In step S308, a baseline model with the smallest MSE, MAE or RMSE is selected. In step S310, transfer learning is performed based on the selected baseline model. The transfer learning data includes the N sets of representative RGB values of the unknown panel and the N sets of XYZ values of the unknown panel. In one embodiment, before transfer learning is performed, sets of Lab values predicted by the forward model of the known panel are first converted into sets of normalized XYZ values (according to the set of XYZ values of the reference white point, in which the set of RGB values is (255, 255, 255)), and the sets of normalized XYZ values of the known panel are compared with the corresponding sets of normalized XYZ values of the unknown panel. In another embodiment, before transfer learning is performed, the sets of measured XYZ values of the unknown panel are firstly converted to sets of Lab values (according to the set of XYZ values of the reference white point, in which the set of RGB values is (255, 255, 255)), and the sets of Lab values of the unknown panel are compared with the corresponding sets of Lab values of the known panel. In step S312, the training is completed to obtain the forward model of the unknown panel. The input of the forward model is a set of RGB values, and the output is a set of Lab values of the unknown panel. In one embodiment, the input to the forward model may be a set of normalized RGB values.

Figure 4:
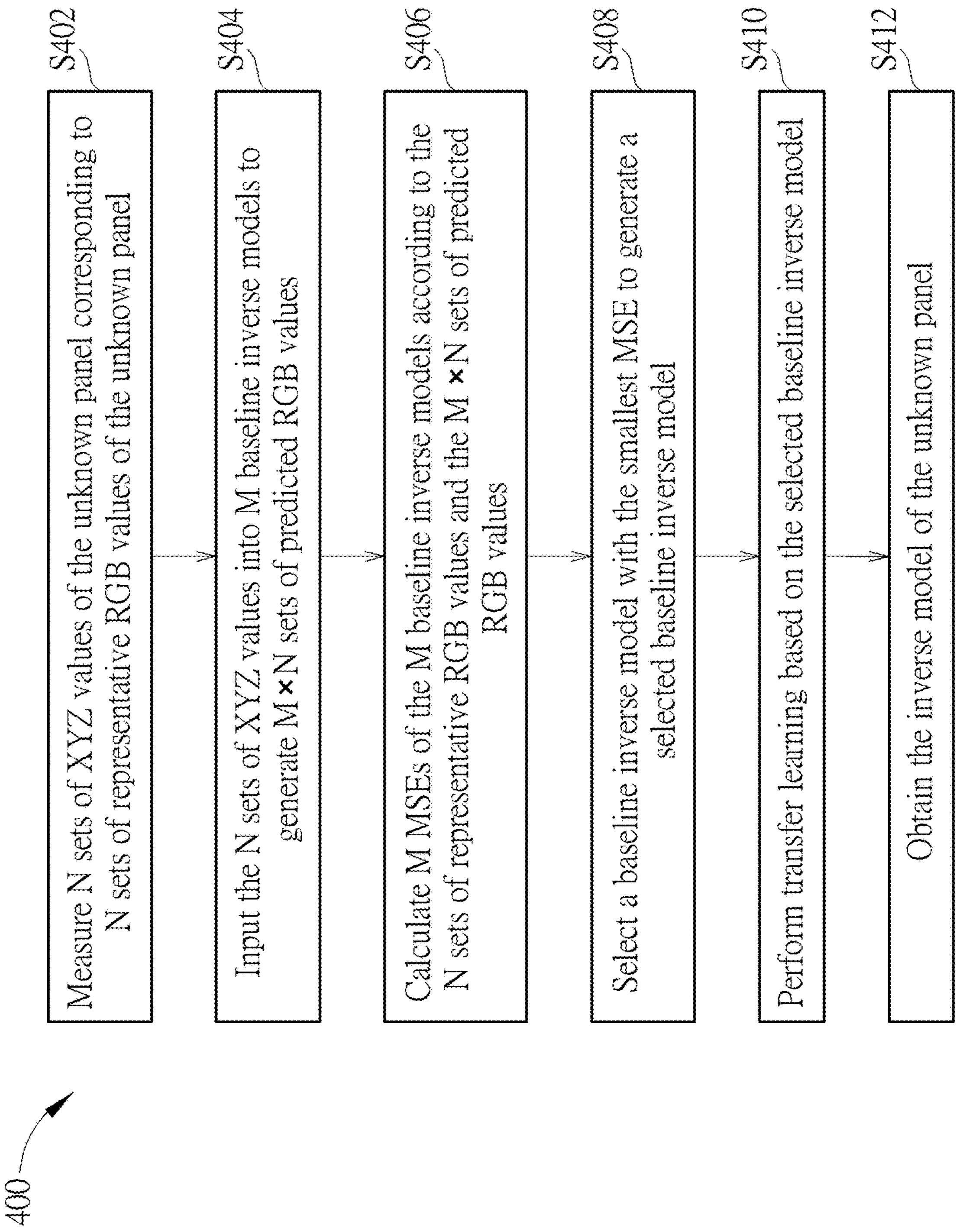
FIG. 4 is a flow chart of an inverse model transfer learning method according to an embodiment of the present invention.

FIG. 4 is a flow chart of an inverse model transfer learning method 400 according to an embodiment of the present invention. The method 400 includes steps S402 to S412. Any reasonable technical changes or step adjustments fall within the scope disclosed by the present invention. Steps S402 to S412 are explained as follows:

- Step S402: Measure N sets of XYZ values of the unknown panel corresponding to N sets of representative RGB values of the unknown panel;

Step S404: Input the N sets of XYZ values into M baseline inverse models to generate M×N sets of predicted RGB values;

Step S406: Calculate M MSEs of the M baseline inverse models according to the N sets of representative RGB values and the M×N sets of predicted RGB values;

Step S408: Select a baseline inverse model with the smallest MSE to generate a selected baseline inverse model;

Step S410: Perform transfer learning based on the selected baseline inverse model; and Step S412: Obtain the inverse model of the unknown panel.

In step S402, N sets of XYZ values corresponding to N sets of representative RGB values of the unknown panel are measured. The N sets of representative RGB values are selected from the method 200 in FIG. 2. In one embodiment, N may be 64. In step S404, N sets of XYZ values of the unknown panel are input into M baseline inverse models to generate M×N sets of predicted RGB values, and each baseline inverse model generates N sets of predicted RGB values. In one embodiment, M may be 15. In step S406, M MSEs of the M baseline inverse models are calculated based on the N sets of representative RGB values and the M×N sets of predicted RGB values. In one embodiment, MSE can be replaced by root mean square error (RMSE) or mean absolute error (MAE). The detailed calculations of MAE, MSE, and RMSE have been illustrated, and thus will not be further elaborated. In step S408, a baseline inverse model with the smallest MSE, MAE or RMSE is selected. In step S410, transfer learning is performed based on the selected baseline inverse model. The transfer learning data includes the N sets of representative RGB values of the unknown panel and the N sets of XYZ values of the unknown panel. In step S412, the training is completed to obtain the inverse model of the unknown panel. The input of the inverse model is a set of XYZ values of the unknown panel, and the output is a set of RGB values. In one embodiment, the input of the inverse model may be a set of normalized XYZ values, and the output may be a set of normalized RGB values.

Figure 5:
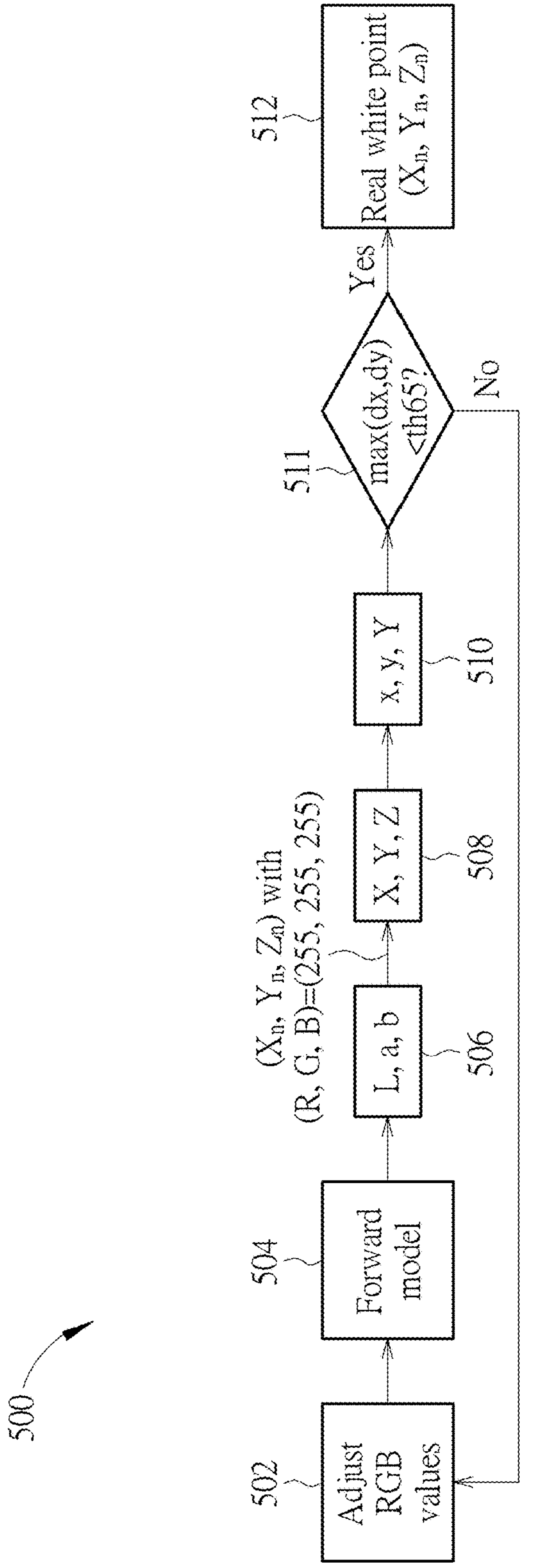
FIG. 5 is a flow chart of a white point correction method according to an embodiment of the present invention.

FIG. 5 is a flow chart of a white point correction method 500 according to an embodiment of the present invention. At the beginning, set the G value in a set of RGB values to the maximum G value (for example, 255), and adjust the R and B values of the set of RGB values to make the x and y values of the forward model close to the x and y values of D65. D65 is the color of a light source with a color temperature of 6500K. Since the G value has the greatest impact on brightness, it is first set to the maximum G value to provide an initial value for the real white point. The normalized XY values are the xy values. The xy values (x, y)=(0.311, 0.329) can be used as a reference white point. In FIG. 5, adjusting the set of RGB values 502 is the first step (that is, fixing G as the maximum G value (for example, 255) and adjusting the R and B values accordingly). The set of adjusted RGB values can be predicted through the forward model 504 to obtain a set of Lab values 506. The set of Lab values 506 is converted to a set of XYZ values 508 through the white point with RGB values (255, 255, 255). The set of XYZ values 508 can be calculated to obtain a set of predicted x, y, Y values 510. Compare the predicted x value with the x value of D65 to generate a difference dx, and compare the predicted y value with the y value of D65 to generate a difference dy. If the differences dx, dy are both less than the threshold th65 (for example, 0.0015) (step 511), ($X_n$, $Y_n$, $Z_n$) 512 can produce a real white point. If the difference dx and/or difference dy exceeds the threshold th65 (for example, 0.0015) (step 511), return to step 502 to adjust the set of RGB values. At first, lower the G value, then adjust the R and B values, and repeat this process until the differences dx and dy are both less than the threshold th65 (for example, 0.0015) (step 511), the real white point of the unknown panel ($X_n$, $Y_n$, $Z_n$) 512 is then obtained through the predicted Y value. In another embodiment, the set of predicted XYZ values can be directly compared with the XYZ values of D65 to find out the real white point of the unknown panel ($X_n$, $Y_n$, $Z_n$) 512 whose XYZ values all differ by less than another threshold. The real white point ($X_n$, $Y_n$, $Z_n$) 512 can be used to convert every set of XYZ values and every set of Lab values of the unknown panel.

Figure 6:
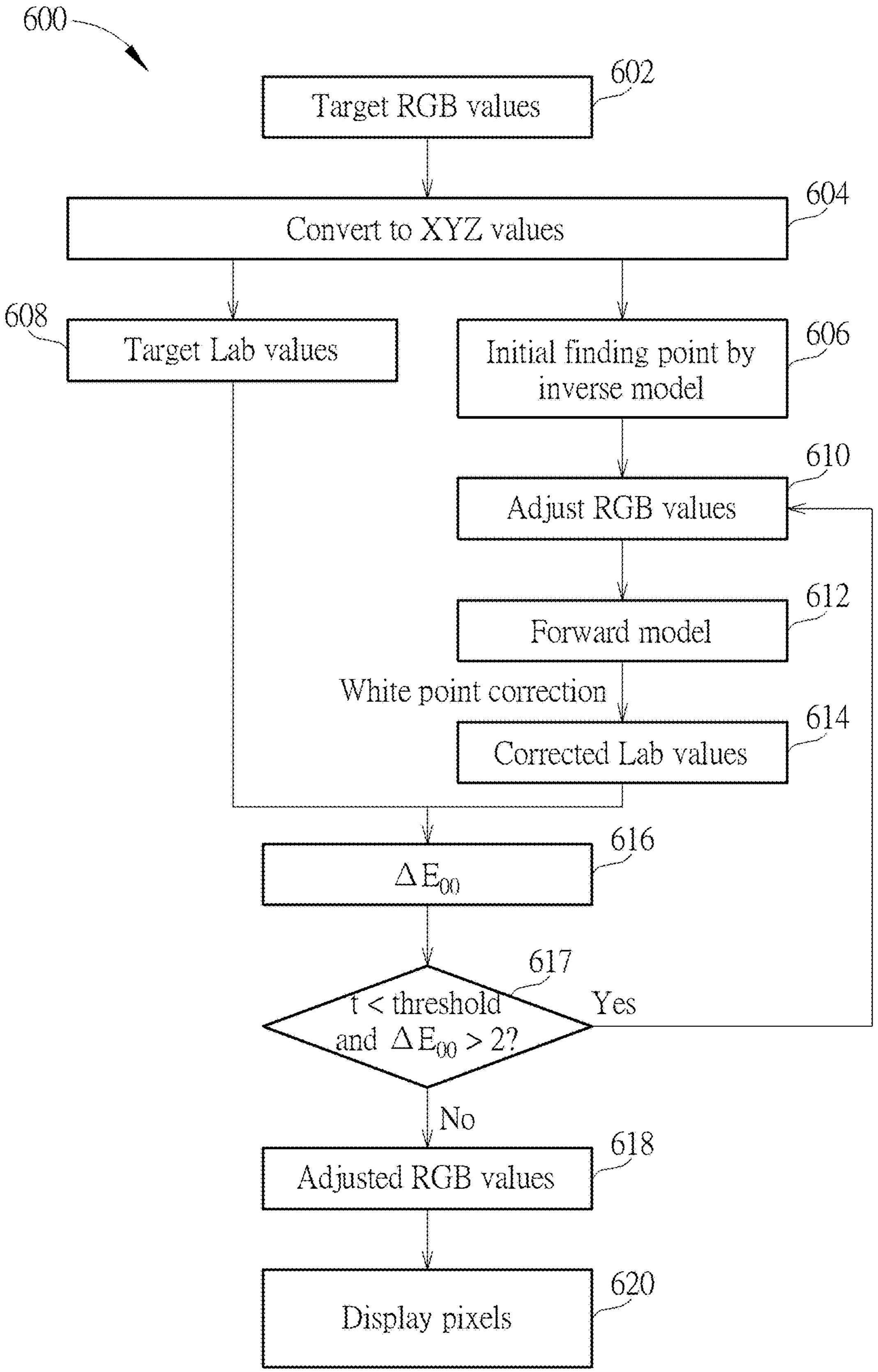
FIG. 6 is a flow chart of a panel color correction method according to an embodiment of the present invention.

FIG. 6 is a flow chart of a panel color correction method 600 according to an embodiment of the present invention. Any reasonable technical changes or step adjustments fall within the scope disclosed by the present invention.

In step 604, the set of target RGB values 602 are first converted to a set of normalized XYZ values of the reference white point D65. Use the following formula:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} g(R_{srgb}) \\ g(G_{srgb}) \\ g(B_{srgb}) \end{bmatrix}$$

where $R_{srgb}$, $G_{srgb}$, $B_{srgb}$ are normalized RGB values, and $$g(f)\begin{cases} \dfrac{f}{12.92}, & f \le 0.04045 \\ \left(\dfrac{f+0.055}{1.055}\right)^{2.2}, & f > 0.04045 \end{cases}, \text{ where } f \text{ is } R_{srgb}, G_{srgb}, B_{srgb}.$$

where f is $R_{srgb}$, $G_{srgb}$, $B_{srgb}$.

Then in step 606, the set of normalized XYZ values is input into a pre-trained inverse model to obtain a set of estimated RGB values. The inverse model is used to estimate the set of estimated RGB values because the inverse model includes the display characteristics of the unknown panel. In one embodiment, if the accuracy of the inverse model 606 is high enough, the set of estimated RGB values can be directly adopted as the final result. In another embodiment, the set of estimated RGB values are all integers, so the set of estimated RGB values still needs to be adjusted, and the inverse model only provides an initial set of estimated RGB values in step 606. The set of normalized XYZ values 604 of the reference white point D65 can be converted into a set of target Lab values 608 through the reference white point D65 for comparison. In one embodiment, the set of normalized XYZ values of the reference white point D65 and the Y value of the real white point are multiplied to generate the set of adjusted XYZ values. Then, the set of adjusted XYZ values is converted into the set of target Lab values 608 according to the set of XYZ values of the real white point. The conversion formula (1) is as follows:

$$\begin{cases} L = 116 f\left(\dfrac{Y}{Y_n}\right) - 16, \\ a = 500\left[f\left(\dfrac{X}{X_n}\right) - f\left(\dfrac{Y}{Y_n}\right)\right], \\ b = 200\left[f\left(\dfrac{Y}{Y_n}\right) - f\left(\dfrac{Z}{Z_n}\right)\right], \end{cases} \quad \text{formula (1)}$$

-continued $$\text{where } f(t)=\begin{cases} t^{1/3}, \text{ if } t>(6/29)^3 \\ \text{otherwise, } \frac{1}{3}(6/29)^3 t+16/116 \end{cases}$$

The set of RGB values estimated by the inverse model 606 provides the initial values, and then the set of RGB values 610 is adjusted to input to a pre-trained forward model 612 to obtain a set of corrected Lab values 614 based on the set of XYZ values of the real white point using formula (1). In some embodiments, after obtaining a set of predicted Lab values output by the forward model 612, the original white point with (R, G, B)=(255, 255, 255) will be used to convert the set of predicted Lab values to a set of XYZ values. Then use formula (1) to convert the set of XYZ values to a set of corrected Lab values 614 based on the set of XYZ values of the real white point. The set of corrected Lab values 614 is used to compare with the set of target Lab values 608. After calculating the error (MSE, MAE, RMSE, or other ΔE00 error indicators) 616, if the error 616 is less than a predetermined error (for example, 2) (step 617), then the set of adjusted RGB values 618 is outputted. If the error 616 is greater than the predetermined error (for example, 2) (step 617), then return to the step 610 to further adjust the set of RGB values, then reuse the forward model 612 and obtain a new set of corrected Lab values. The process is repeated until ΔE00<predetermined error (For example, 2) or the number of attempts t reaches a threshold (step 617), then the set of adjusted RGB values 618 is outputted, and the pixel is displayed according to the set of adjusted RGB values (step 620).

The forward model establishing method, inverse model establishing method, white point correction method and color shift correction method used in the embodiments of the present invention can all be implemented by any combination of software, firmware or hardware.

In summary, the present invention uses transfer learning to establish the forward model and inverse model of unknown panels in a short time, which is more efficient, saving more manpower and time than existing methods. Before applying the color correction method, white point correction method is used to ensure the brightness accuracy after color correction. The accurate forward model ensures the accuracy of color compensation, and in the color correction process, the pre-trained inverse model provides effective initial color estimate, allowing for rapid correction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of correcting color shifts in display panels, the method comprising:

converting a set of target RGB values to a set of XYZ values;

converting the set of XYZ values to a set of RGB values using an inverse model, the inverse model being trained based on a neural network model;

converting the set of XYZ values to a set of target Lab values according to a real white point of a panel under test;

converting the set of RGB values to a set of predicted Lab values according to the real white point and a forward model, the forward model being trained based on another neural network model;

adjusting the set of RGB values according to the set of predicted Lab values and the set of target Lab values; and displaying a pixel by a panel under test according to the set of adjusted RGB values.

2. The method of claim 1, further comprising normalizing the set of target RGB values and the set of XYZ values.

3. The method of claim 1, further comprising:

performing correction of the real white point according to the forward model to generate a set of XYZ values of the real white point, wherein converting the set of XYZ values to the set of target Lab values according to the real white point of the panel under test comprises:

converting the set of XYZ values to the set of target Lab values according to the set of XYZ values of the real white point of the panel under test; and converting the set of RGB values to the set of predicted Lab values according to the real white point and the forward model comprises:

converting the set of RGB values to the set of predicted Lab values according to the set of XYZ values of the real white point and the forward model.

4. The method of claim 3, wherein converting the set of XYZ values to the set of target Lab values according to the set of XYZ values of the real white point of the panel under test comprises:

generating a set of adjusted XYZ values according to a Y value of the real white point and the set of XYZ values; and converting the set of adjusted XYZ values to the set of target Lab values according to the set of XYZ values of the real white point.

5. The method of claim 3, wherein performing correction of the real white point according to the forward model to generate the set of XYZ values of the real white point comprises:

setting an initial G value to a maximum G value;

adjusting R and B values to enable xy values corresponding to the set of predicted Lab values to approach xy values of a reference white point; and outputting the set of XYZ values of the real white point of the panel under test according to the set of predicted Lab values.

6. The method of claim 5, wherein the reference white point is determined according to a light source having a color temperature of 6500K.

7. The method of claim 5, wherein performing correction of the real white point according to the forward model to generate the set of XYZ values of the real white point further comprises:

selectively lowering a G value according to the xy values corresponding to the set of predicted Lab values and the xy values of the reference white point.

8. The method of claim 1, wherein adjusting the set of RGB values according to the set of predicted Lab values and the set of target Lab values is adjusting the set of RGB values according to whether a first error indicator of the set of predicted Lab values and the set of target Lab values is greater than a predetermined error.

9. The method of claim 8, wherein the first error indicator is a mean square error, root mean square error or mean absolute error.

10. The method of claim 1, wherein a training process of the forward model comprises:

measuring first sets of XYZ values corresponding to sets of representative RGB values of the panel under test;

calculating M second error indicators of M baseline models according to second sets of XYZ values of the panel under test and second sets of predicted XYZ values of the M baseline models;

obtaining from the M baseline models a selected baseline model having a minimum second error indicator in the M second error indicators; and training the selected baseline model according to the sets of representative RGB values and first sets of corresponding Lab values of the panel under test to generate the forward model, wherein M is a positive integer.

11. The method of claim 10, further comprising:

inputting the first sets of representative RGB values into the M baseline models to generate the second sets of predicted XYZ values.

12. The method of claim 10, wherein the M second error indicators are mean square errors, root mean square errors or mean absolute errors.

13. The method of claim 10, wherein the training process of the forward model further comprises:

establishing another neural network model having a plurality of sets of RGB values as inputs and a plurality of sets of Lab values as outputs;

training the M baseline models for the another neural network model according to data from M known panels; and selecting the sets of representative RGB values.

14. The method of claim 13, wherein selecting the sets of representative RGB values comprises:

selecting sets of uniformly distributed RGB values;

calculating second sets of Lab values of the M baseline models according to the sets of uniformly distributed RGB values;

calculating third error indicators of the second sets of Lab values corresponding to the sets of uniformly distributed RGB values; and selecting first sets of RGB values from the sets of uniformly distributed RGB values having N smallest third error indicators in the third error indicators as the sets of representative RGB values, wherein N is a positive integer.

15. The method of claim 14, wherein the third error indicators are mean square errors, root mean square errors or mean absolute errors.

16. The method of claim 1, wherein a training process of the inverse model comprises:

measuring first sets of XYZ values corresponding to sets of representative RGB values of the panel under test;

calculating M fourth error indicators of M inverse baseline models according to the sets of representative RGB values and second sets of predicted RGB values of the M inverse baseline models;

extracting from the M inverse baseline models a selected inverse baseline model having a minimum fourth error indicator in the M fourth error indicators; and training the selected inverse baseline model according to the first sets of XYZ values of the panel under test and the sets of representative RGB values to generate the inverse model, wherein M is a positive integer.

17. The method of claim 16, further comprising:

inputting the first sets of XYZ values of the panel under test into the M inverse baseline models to generate the second sets of predicted RGB values.

18. The method of claim 16, wherein the M fourth error indicators are mean square errors, root mean square errors or mean absolute errors.

19. The method of claim 16, wherein the training process of the inverse model further comprises:

establishing the neural network model having a plurality of sets of XYZ values as inputs and a plurality of sets of RGB values as outputs;

training the M inverse baseline models for the neural network model according to data from M known panels; and selecting the sets of representative RGB values.

20. The method of claim 19, wherein selecting the sets of representative RGB values comprises:

selecting sets of uniformly distributed RGB values;

calculating first sets of RGB values of the M inverse baseline models according to second sets of XYZ values corresponding to the sets of uniformly distributed RGB values;

calculating fifth error indicators of the first sets of RGB values; and selecting second sets of RGB values from the first sets of RGB values having N smallest fifth error indicators in the fifth error indicators as the sets of representative RGB values, wherein N is a positive integer.

21. The method of claim 19, wherein the fifth error indicators are mean square errors, root mean square errors or mean absolute errors.

22. A correction method for color shifts in display panels, comprising:

converting a set of XYZ values to a set of target Lab values according to a real white point of a panel under test;

converting the set of XYZ values to a set of RGB values according to an inverse model, the inverse model being generated based on a neural network model training;

converting the set of RGB values to a set of predicted Lab values according to the real white point and a forward model, the forward model being generated based on another neural network model training;

adjusting the set of RGB values according to the set of predicted Lab values and the set of target Lab values to generate a set of adjusted RGB values; and displaying a pixel on the panel under test according to the set of adjusted RGB values.

23. The correction method of claim 22, further comprising:

performing correction of the real white point according to the forward model to generate a set of XYZ values of the real white point, wherein converting the set of XYZ values to the set of target Lab values according to the real white point of the panel under test comprises:

converting the set of XYZ values to the set of target Lab values according to the set of XYZ values of the real white point of the panel under test; and converting the set of RGB values to the set of predicted Lab values according to the real white point and the forward model comprises:

converting the set of RGB values to the set of predicted Lab values according to the set of XYZ values of the real white point and the forward model.

24. The correction method of claim 23, wherein converting the set of XYZ values to the set of target Lab values according to the set of XYZ values of the real white point of the panel under test comprises:

generating a set of adjusted XYZ values according to the Y value of the real white point and the set of XYZ values; and converting the set of adjusted XYZ values to the set of target Lab values according to the set of XYZ values of the real white point.

25. The correction method of claim 23, wherein performing correction of the real white point according to the forward model to generate the set of XYZ values of the real white point comprises:

setting an initial G value to a maximum G value;

adjusting R and B values to enable xy values corresponding to the set of predicted Lab values to approach xy values of a reference white point; and outputting the set of XYZ value of the real white point of the panel under test according to the xy values corresponding to the set of predicted Lab values.

26. The correction method of claim 25, wherein the reference white point is determined according to a light source having a color temperature of 6500K.

27. The correction method of claim 25, wherein performing correction of the real white point according to the forward model to generate the set of XYZ values of the real white point further comprises:

selectively lowering a G value according to the xy values corresponding to the set of predicted Lab values and the xy values of the reference white point.

28. The correction method of claim 22, wherein adjusting the set of RGB values according to the set of predicted Lab values and the set of target Lab values to generate the set of adjusted RGB values is performed according to whether a first error indicator of the set of predicted Lab values and the set of target Lab values is greater than a predetermined error.

29. The correction method of claim 22, wherein a training process of the forward model comprises:

measuring first sets of XYZ values corresponding to sets of representative RGB values of the panel under test;

calculating M second error indicators of M baseline models according to second sets of XYZ values of the panel under test and second sets of predicted XYZ values of the M baseline models;

obtaining from the M baseline models a selected baseline model having a minimum second error indicator in the M second error indicators; and training the selected baseline model according to the sets of representative RGB values and first sets of corresponding Lab values of the panel under test to generate the forward model, wherein M is a positive integer.

30. The correction method of claim 29, further comprising:

inputting the first sets of representative RGB values into the M baseline models to generate the second sets of predicted XYZ values.

31. The correction method of claim 29, wherein the training process of the forward model further comprises:

establishing another neural network model having a plurality of sets of RGB values as inputs and a plurality of sets of Lab values as outputs;

training the M baseline models for the another neural network model according to data from M known panels; and selecting the sets of representative RGB values.

32. The correction method of claim 31, wherein selecting the sets of representative RGB values comprises:

selecting sets of uniformly distributed RGB values;

calculating second sets of Lab values of the M baseline models according to the sets of uniformly distributed RGB values;

calculating third error indicators of the second sets of Lab values corresponding to the sets of uniformly distributed RGB values; and selecting first sets of RGB values from the sets of uniformly distributed RGB values having N smallest third error indicators in the third error indicators as the sets of representative RGB values, wherein N is a positive integer.

33. The correction method of claim 22, wherein a training process of the inverse model comprises:

measuring first sets of XYZ values corresponding to sets of representative RGB values of the panel under test;

calculating M fourth error indicators of M inverse baseline models according to the sets of representative RGB values and second sets of predicted RGB values of the M inverse baseline models;

extracting from the M inverse baseline models a selected inverse baseline model having a minimum fourth error indicator in the M fourth error indicators; and training the selected inverse baseline model according to the first sets of XYZ values of the panel under test and the sets of representative RGB values to generate the inverse model, wherein M is a positive integer.

* * * * *